United States Patent
Xing

(12) 
(10) Patent No.: US 10,104,614 B2
(45) Date of Patent: Oct. 16, 2018

(54) METHOD FOR WAKING UP ACCESS POINT DEVICE, DEVICE, AND SYSTEM

(71) Applicant: Huawei Technologies Co., Ltd., Shenzhen (CN)

(72) Inventor: Zhihao Xing, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 85 days.

(21) Appl. No.: 15/131,772

(22) Filed: Apr. 18, 2016

(65) Prior Publication Data

US 2016/0234783 A1    Aug. 11, 2016

Related U.S. Application Data

(63) Continuation of application No. PCT/CN2013/085475, filed on Oct. 18, 2013.

(51) Int. Cl.
*G08C 17/00* (2006.01)
*H04W 52/02* (2009.01)
*H04W 76/27* (2018.01)

(52) U.S. Cl.
CPC ... *H04W 52/0229* (2013.01); *H04W 52/0206* (2013.01); *H04W 76/27* (2018.02); *Y02D 70/00* (2018.01); *Y02D 70/142* (2018.01)

(58) Field of Classification Search
CPC .......... H04W 52/0229; H04W 76/046; H04W 76/27; H04W 70/142; H04W 70/00
(Continued)

(56) References Cited

U.S. PATENT DOCUMENTS

| | | | |
|---|---|---|---|
| 2006/0116109 A1* | 6/2006 | Lortz | H04L 63/08 455/412.2 |
| 2009/0116406 A1* | 5/2009 | Suzuki | H04L 45/02 370/254 |
| 2009/0240794 A1 | 9/2009 | Liu et al. | |

(Continued)

FOREIGN PATENT DOCUMENTS

| | | |
|---|---|---|
| CN | 101541068 A | 9/2009 |
| CN | 101572938 A | 11/2009 |

(Continued)

OTHER PUBLICATIONS

"IEEE Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications," IEEE Computer Society, IEEE Std 802.11 2012, Mar. 29, 2012, pp. 1-2793.

*Primary Examiner* — Faisal Choudhury
(74) *Attorney, Agent, or Firm* — Slater Matsil, LLP

(57) ABSTRACT

Embodiments provide a waking-up system made up of an access point (AP) device, a terminal device and a wakeup server. The wakeup server comprises a receiving unit, configured to receive an AP activation request sent by the terminal device, where the AP activation request includes an identity of the terminal device. Also included a determining unit, configured to determine a target AP device according to the AP activation request. Also included is an acquiring unit, configured to acquire a status of the target AP device, and a sending unit, configured to send a wakeup request to the target AP device, wherein the sending unit is further configured to send a first AP activation success response to the terminal device.

6 Claims, 8 Drawing Sheets

(58) Field of Classification Search
USPC .................................................. 370/331, 311
See application file for complete search history.

(56) References Cited

U.S. PATENT DOCUMENTS

| | | | |
|---|---|---|---|
| 2010/0056184 A1 | 3/2010 | Vakil et al. | |
| 2011/0022812 A1* | 1/2011 | van der Linden | G06F 9/5077 711/163 |
| 2011/0092234 A1 | 4/2011 | Kim et al. | |
| 2011/0223913 A1 | 9/2011 | Kho et al. | |
| 2012/0213134 A1* | 8/2012 | Woo | G06F 1/3209 370/311 |
| 2012/0282891 A1* | 11/2012 | Mohammed | H04L 63/0428 455/406 |
| 2013/0182611 A1* | 7/2013 | Kneckt | H04W 8/005 370/255 |
| 2014/0029494 A1* | 1/2014 | Sundaram | H04W 52/0235 370/311 |
| 2014/0078950 A1* | 3/2014 | Jung | H04W 52/0235 370/311 |
| 2014/0179300 A1 | 6/2014 | Kim | |
| 2014/0269476 A1* | 9/2014 | Weston | H04W 52/0206 370/311 |
| 2015/0011226 A1* | 1/2015 | De Sousa | H04W 24/02 455/446 |

FOREIGN PATENT DOCUMENTS

| | | |
|---|---|---|
| CN | 101657007 A | 2/2010 |
| CN | 102045807 A | 5/2011 |
| CN | 102056176 A | 5/2011 |
| CN | 102132600 A | 7/2011 |
| CN | 102421134 A | 4/2012 |
| CN | 104113883 A | 10/2014 |
| CN | 105101343 A1 | 11/2015 |
| EP | 2312889 A1 | 4/2011 |
| EP | 2317801 A2 | 5/2011 |

* cited by examiner

METHOD FOR WAKING UP ACCESS POINT DEVICE, DEVICE, AND SYSTEM

This application is a continuation of International Application No. PCT/CN2013/085475, filed on Oct. 18, 2013, which is hereby incorporated by reference in its entirety.

TECHNICAL FIELD

The present application relates to the communications field, and in particular, to a method for waking up an access point device, a device, and a system.

BACKGROUND

In an existing communications network, a wireless access point (AP) device may connect a terminal device to a network. Generally, to keep information synchronization with the terminal device, the AP device periodically broadcasts a beacon frame, and needs to respond to a network entry request of the terminal device at any time; therefore, the AP device remains in an awake state all the time. However, in some periods of time, the AP device is in an idle state, that is, no terminal device requests to access the network, which therefore causes high power consumption of the AP device. To reduce power consumption of the AP device, a sleep and wakeup mechanism of the AP device is introduced. When the AP device is in a sleep state, only some modules are in an awake state, and the other modules are all in a power-off state.

In the prior art, an AP device periodically sleeps and wakes up according to a sleep time period and a wakeup time period that are preset by a user. However, when the AP device is in the sleep time period, if a terminal device needs to access a network, the AP device cannot provide support, and can connect the terminal device to the network only after entering the wakeup time period. Therefore, the existing process of waking up an AP device is relatively inflexible.

SUMMARY

Embodiments of the present application provide a method for waking up an access point device, a device, and a system, which can improve flexibility of a process of waking up an AP device.

To achieve the foregoing objective, the following technical solutions are used in the embodiments of the present application.

According to a first aspect, a wakeup server is provided. The server includes a receiving unit, configured to receive an AP activation request sent by a terminal device, where the AP activation request includes an identity of the terminal device. The server also includes a determining unit, configured to determine a target AP device according to the AP activation request received by the receiving unit. The server also includes an acquiring unit, configured to acquire a status of the target AP device, and a sending unit, configured to: when the target AP device is in a sleep state, send a wakeup request to the target AP device, so that the target AP device switches to an awake state according to the wakeup request. The sending unit is further configured to send a first AP activation success response to the terminal device.

Optionally, the sending unit is further configured to: when the target AP device is in an awake state, send a second AP activation success response to the terminal device.

Optionally, the receiving unit is further configured to receive a registration request of a first AP device, where the first AP device is at least one AP device in a management range of the wakeup server, and the registration request includes an identity of the first AP device and a wakeup address of the first AP device; and the sending unit is further configured to send registration response information to the first AP device.

Optionally, the AP activation request further includes at least one of a target AP device list and location determining information, where the target AP device list records an identity of at least one target AP device, and the location determining information includes location information of the terminal device, a wakeup distance range, and a maximum quantity of APs that are to be woken up.

Optionally, the AP activation request includes the target AP device list, and the determining unit specifically includes: a first determining subunit, configured to determine a to-be-selected AP device; and a second determining subunit, configured to determine, in the to-be-selected AP device, that an AP device corresponding to an identity, which is recorded in the target AP device list, of a target AP device is the target AP device.

Optionally, the registration request further includes location information of the first AP device, the AP activation request includes the location determining information, and the determining unit specifically includes: a first determining subunit, configured to determine a to-be-selected AP device; a second determining subunit, configured to determine, in the to-be-selected AP device according to the location information of the terminal device and location information, which is recorded by the wakeup server, of an AP device, that an AP device that is away from the terminal device by a distance within the wakeup distance range is a candidate target AP device; and a third determining subunit, configured to determine, in the candidate target AP device, that the former T AP devices having optimal quality of service are target AP devices, where T is less than or equal to a threshold of the quantity of APs that are to be woken up.

Optionally, the registration request further includes an authorized wakeup list, and the authorized wakeup list records an identity of a terminal device that is allowed to wake up the first AP device and an authentication parameter of the terminal device.

Optionally, the AP activation request further includes an authentication parameter of the terminal device, and the first determining subunit is specifically configured to: perform matching between the authentication parameter of the terminal device in the AP activation request and the authentication parameter, which is recorded in the authorized wakeup list saved by the wakeup server, of the terminal device that is allowed to wake up the AP device; perform matching between the identity of the terminal device in the AP activation request and the identity, which is recorded in the authorized wakeup list saved by the wakeup server, of the terminal device that is allowed to wake up the AP device; and when an authorized wakeup list in which an authentication parameter and an identity of a terminal device are both the same as the authentication parameter and the identity of the terminal device in the AP activation request exists in the authorized wakeup list saved by the wakeup server, acquire an AP device providing the authorized wakeup list as the to-be-selected AP device.

Optionally, the registration request further includes a public identifier, and the public identifier indicates that the first AP device allows waking up by any terminal device, and the first determining subunit is specifically configured to: acquire an AP device allowing waking up by any terminal device as the to-be-selected AP device.

Optionally, the receiving unit is further configured to receive status update information sent by the first AP device, where the status update information includes an updated status of the AP device; and the wakeup server further includes: a recording unit, configured to record the updated status of the AP device.

According to a second aspect, a terminal device is provided. The terminal device includes a sending unit, configured to: send an AP activation request to a wakeup server, so that the wakeup server determines a target AP device according to the AP activation request, and when the target AP device is in a sleep state, wakes up the target AP device, where the AP activation request includes an identity of the terminal device. The terminal device also includes a receiving unit, configured to receive an activation success response sent by the wakeup server.

Optionally, the AP activation request further includes at least one of a target AP device list and location determining information, where the target AP device list records an identity of at least one target AP device, and the location determining information includes location information of the terminal device, a wakeup distance range, and a maximum quantity of APs that are to be woken up.

Optionally, the AP activation request further includes an authentication parameter of the terminal device.

According to a third aspect, an AP device is provided. The AP device includes a receiving unit, configured to receive an activation request sent by a wakeup server, where the activation request is sent when the wakeup server determines that the AP device is in a sleep state; and a switching unit, configured to switch the AP device to an awake state according to the wakeup request.

Optionally, the AP device further includes: a generation unit, configured to generate a registration request, where the registration request includes an identity of the AP device and a wakeup address of the AP device; and a sending unit, configured to send the registration request to the wakeup server, so that when the AP device needs to be woken up, the wakeup server sends the wakeup request to the AP device according to the registration request, where the receiving unit is further configured to receive registration response information sent by the wakeup server.

Optionally, the registration request further includes location information of the AP device.

Optionally, the registration request further includes an authorized wakeup list, and the authorized wakeup list records an identity of a terminal device that is allowed to wake up the AP device and an authentication parameter of the terminal device.

Optionally, the generation unit is further configured to: when a status of the AP device changes, generate status update information, where the status update information includes an updated status of the AP device; and the sending unit is further configured to send the status update information to the wakeup server, so that the wakeup server records the updated status of the AP device.

According to a fourth aspect, a method for waking up an access point AP device is provided. The method is applied to a wakeup server. The method includes receiving an AP activation request sent by a terminal device, where the AP activation request includes an identity of the terminal device. The method also includes determining a target AP device according to the AP activation request, and acquiring a status of the target AP device. When the target AP device is in a sleep state, the method also includes sending a wakeup request to the target AP device, so that the target AP device switches to an awake state according to the wakeup request; and sending a first AP activation success response to the terminal device.

Optionally, the method further includes: when the target AP device is in an awake state, sending a second AP activation success response to the terminal device.

Optionally, before the receiving an AP activation request sent by a terminal device, the method further includes: receiving a registration request of a first AP device, where the first AP device is at least one AP device in a management range of the wakeup server, and the registration request includes an identity of the first AP device and a wakeup address of the first AP device; and sending registration response information to the first AP device.

Optionally, the AP activation request further includes at least one of a target AP device list and location determining information, where the target AP device list records an identity of at least one target AP device, and the location determining information includes location information of the terminal device, a wakeup distance range, and a maximum quantity of APs that are to be woken up.

Optionally, the AP activation request includes the target AP device list, and the determining a target AP device according to the AP activation request includes: determining a to-be-selected AP device; and determining, in the to-be-selected AP device, that an AP device corresponding to an identity, which is recorded in the target AP device list, of a target AP device is the target AP device.

Optionally, the registration request further includes location information of the first AP device, the AP activation request includes the location determining information, and the determining a target AP device according to the AP activation request includes: determining a to-be-selected AP device; determining, in the to-be-selected AP device according to the location information of the terminal device and location information, which is recorded by the wakeup server, of an AP device, that an AP device that is away from the terminal device by a distance within the wakeup distance range is a candidate target AP device; and determining, in the candidate target AP device, that the former T AP devices having optimal quality of service are target AP devices, where T is less than or equal to a threshold of the quantity of APs that are to be woken up.

Optionally, the registration request further includes an authorized wakeup list, and the authorized wakeup list records an identity of a terminal device that is allowed to wake up the first AP device and an authentication parameter of the terminal device.

Optionally, the AP activation request further includes an authentication parameter of the terminal device. The determining a to-be-selected AP device includes: performing matching between the authentication parameter of the terminal device in the AP activation request and the authentication parameter, which is recorded in the authorized wakeup list saved by the wakeup server, of the terminal device that is allowed to wake up the AP device; performing matching between the identity of the terminal device in the AP activation request and the identity, which is recorded in the authorized wakeup list saved by the wakeup server, of the terminal device that is allowed to wake up the AP device; and when an authorized wakeup list in which an authentication parameter and an identity of a terminal device are both the same as the authentication parameter and the identity of the terminal device in the AP activation request exists in the authorized wakeup list saved by the wakeup server, acquiring an AP device providing the authorized wakeup list as the to-be-selected AP device.

Optionally, the registration request further includes a public identifier, and the public identifier indicates that the first AP device allows waking up by any terminal device, and the determining a to-be-selected AP device includes: acquiring an AP device allowing waking up by any terminal device as the to-be-selected AP device.

Optionally, after the sending registration response information to the first AP device, the method further includes: receiving status update information sent by the first AP device, where the status update information includes an updated status of the AP device; and recording the updated status of the AP device.

According to a fifth aspect, a method for waking up an AP device is provided. The method is applied to a terminal device. The method includes sending an AP activation request to a wakeup server, so that the wakeup server determines a target AP device according to the AP activation request, and when the target AP device is in a sleep state, wakes up the target AP device, where the AP activation request includes an identity of the terminal device; and receiving an activation success response sent by the wakeup server.

Optionally, the AP activation request further includes at least one of a target AP device list and location determining information, where the target AP device list records an identity of at least one target AP device, and the location determining information includes location information of the terminal device, a wakeup distance range, and a maximum quantity of APs that are to be woken up.

Optionally, the AP activation request further includes an authentication parameter of the terminal device.

According to a sixth aspect, a method for waking up an AP device is provided. The method is applied to an AP device. The method includes receiving an activation request sent by a wakeup server, where the activation request is sent when the wakeup server determines that the AP device is in a sleep state; and switching the AP device to an awake state according to a wakeup request.

Optionally, before the receiving an activation request sent by a wakeup server, the method further includes: generating a registration request, where the registration request includes an identity of the AP device and a wakeup address of the AP device; sending the registration request to the wakeup server, so that when the AP device needs to be woken up, the wakeup server sends the wakeup request to the AP device according to the registration request; and receiving registration response information sent by the wakeup server.

Optionally, the registration request further includes location information of the AP device.

Optionally, the registration request further includes an authorized wakeup list, and the authorized wakeup list records an identity of a terminal device that is allowed to wake up the AP device and an authentication parameter of the terminal device.

Optionally, after the receiving registration response information sent by the wakeup server, the method further includes: when a status of the AP device changes, generating status update information, where the status update information includes an updated status of the AP device; and sending the status update information to the wakeup server, so that the wakeup server records the updated status of the AP device.

According to a seventh aspect, a communications system is provided, including: any wakeup server described above; any terminal device described above; and any AP device described above.

According to an eighth aspect, a wakeup server is provided. The server includes a receiver, configured to receive an AP activation request sent by a terminal device, where the AP activation request includes an identity of the terminal device. The server also includes a processor, configured to determine a target AP device according to the AP activation request, where the processor is further configured to acquire a status of the target AP device. The server also includes a transmitter, configured to: when the target AP device is in a sleep state, send a wakeup request to the target AP device, so that the target AP device switches to an awake state according to the wakeup request, where the transmitter is further configured to send a first AP activation success response to the terminal device.

Optionally, the transmitter is further configured to: when the target AP device is in an awake state, send a second AP activation success response to the terminal device.

Optionally, the receiver is further configured to receive a registration request of a first AP device, where the first AP device is at least one AP device in a management range of the wakeup server, and the registration request includes an identity of the first AP device and a wakeup address of the first AP device; and the transmitter is further configured to send registration response information to the first AP device.

Optionally, the AP activation request further includes at least one of a target AP device list and location determining information, where the target AP device list records an identity of at least one target AP device, and the location determining information includes location information of the terminal device, a wakeup distance range, and a maximum quantity of APs that are to be woken up.

Optionally, the AP activation request includes the target AP device list, and the processor is specifically configured to: determine a to-be-selected AP device; and determine, in the to-be-selected AP device, that an AP device corresponding to an identity, which is recorded in the target AP device list, of a target AP device is the target AP device.

Optionally, the registration request further includes location information of the first AP device, the AP activation request includes the location determining information, and the processor is specifically configured to: determine a to-be-selected AP device; determine, in the to-be-selected AP device according to the location information of the terminal device and location information, which is recorded by the wakeup server, of an AP device, that an AP device that is away from the terminal device by a distance within the wakeup distance range is a candidate target AP device; and determine, in the candidate target AP device, that the former T AP devices having optimal quality of service are target AP devices, where T is less than or equal to a threshold of the quantity of APs that are to be woken up.

Optionally, the registration request further includes an authorized wakeup list, and the authorized wakeup list records an identity of a terminal device that is allowed to wake up the first AP device and an authentication parameter of the terminal device.

Optionally, the AP activation request further includes an authentication parameter of the terminal device, and the processor is specifically configured to: perform matching between the authentication parameter of the terminal device in the AP activation request and the authentication parameter, which is recorded in the authorized wakeup list saved by the wakeup server, of the terminal device that is allowed to wake up the AP device; perform matching between the identity of the terminal device in the AP activation request and the identity, which is recorded in the authorized wakeup list saved by the wakeup server, of the terminal device that is allowed to wake up the AP device; and when an authorized wakeup list in which an authentication parameter and an identity of a terminal device are both the same as the authentication parameter and the identity of the terminal device in the AP activation request exists in the authorized wakeup list saved by the wakeup server, acquire an AP device providing the authorized wakeup list as the to-be-selected AP device.

Optionally, the registration request further includes a public identifier, and the public identifier indicates that the first AP device allows waking up by any terminal device, and the processor is specifically configured to: acquire an AP device allowing waking up by any terminal device as the to-be-selected AP device.

Optionally, the receiver is further configured to receive status update information sent by the first AP device, where the status update information includes an updated status of the AP device; and the processor is further configured to record the updated status of the AP device.

According to a ninth aspect, a terminal device is provided. The terminal device includes a transmitter, configured to: send an AP activation request to a wakeup server, so that the wakeup server determines a target AP device according to the AP activation request, and when the target AP device is in a sleep state, wakes up the target AP device. The AP activation request includes an identity of the terminal device. The terminal device also includes receiver, configured to receive an activation success response sent by the wakeup server.

Optionally, the AP activation request further includes at least one of a target AP device list and location determining information, where the target AP device list records an identity of at least one target AP device, and the location determining information includes location information of the terminal device, a wakeup distance range, and a maximum quantity of APs that are to be woken up.

Optionally, the AP activation request further includes an authentication parameter of the terminal device.

According to a tenth aspect, an AP device is provided. The AP device includes a receiver, configured to receive an activation request sent by a wakeup server, where the activation request is sent when the wakeup server determines that the AP device is in a sleep state. The AP device also includes a processor, configured to switch the AP device to an awake state according to a wakeup request.

Optionally, the processor is further configured to generate a registration request, where the registration request includes an identity of the AP device and a wakeup address of the AP device; and the AP device further includes: a transmitter, configured to send the registration request to the wakeup server, so that when the AP device needs to be woken up, the wakeup server sends the wakeup request to the AP device according to the registration request, where the receiver is further configured to receive registration response information sent by the wakeup server.

Optionally, the registration request further includes location information of the AP device.

Optionally, the registration request further includes an authorized wakeup list, and the authorized wakeup list records an identity of a terminal device that is allowed to wake up the AP device and an authentication parameter of the terminal device.

The processor is further configured to: when a status of the AP device changes, generate status update information, where the status update information includes an updated status of the AP device; and the AP device further includes: a transmitter, configured to send the status update information to the wakeup server, so that the wakeup server records the updated status of the AP device.

According to an eleventh aspect, a communications system is provided, including: any wakeup server described above; any terminal device described above; and any AP device described above.

The embodiments of the present application provide a method for waking up an access point device, a device, and a system, The device includes a receiving unit, configured to receive an AP activation request sent by a terminal device, where the AP activation request includes an identity of the terminal device. The device also includes a determining unit, configured to determine a target AP device according to the AP activation request received by the receiving unit. The device also includes an acquiring unit, configured to acquire a status of the target AP device. The device also includes a sending unit, configured to: when the target AP device is in a sleep state, send a wakeup request to the target AP device, so that the target AP device switches to an awake state according to the wakeup request, where the sending unit is further configured to send a first AP activation success response to the terminal device. In this way, because a wakeup server is added to a communications system, when the terminal device needs to wake up an AP device, the determining unit determines a corresponding target AP device, and the sending unit wakes up the target AP device, which is not limited by a time or by a status of the AP device, thereby improving flexibility of a process of waking up the AP device.

BRIEF DESCRIPTION OF THE DRAWINGS

For a more complete understanding of the present invention, and the advantages thereof, reference is now made to the following descriptions taken in conjunction with the accompanying drawings, in which.

To describe the technical solutions in the embodiments of the present application more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
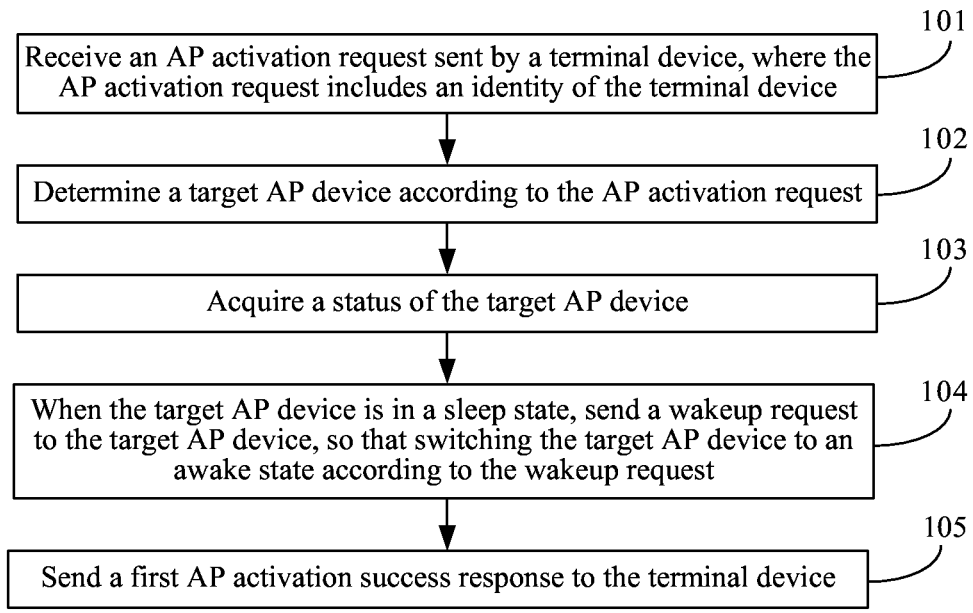
FIG. 1 is a flowchart of a method for waking up an AP device according to an embodiment of the present application.
Figure 2:
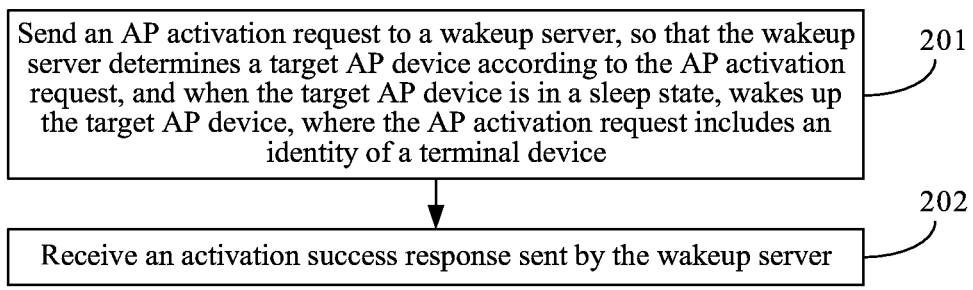
FIG. 2 is a flowchart of another method for waking up an AP device according to an embodiment of the present application.

An embodiment of the present application provides a method for waking up an AP device, where the method is applied to a wakeup server. The wakeup server is a server having a specific Internet Protocol (IP) address, and the specific IP address may be a static external IP address, or may be a static internal IP address, as long as a terminal device and an AP device that are in a management range of the wakeup server can acquire the specific IP address. As shown in FIG. 1, the method includes the following steps.

Step 101: Receive an AP activation request sent by a terminal device, where the AP activation request includes an identity of the terminal device.

Step 102: Determine a target AP device according to the AP activation request.

Step 103: Acquire a status of the target AP device.

Step 104: When the target AP device is in a sleep state, send a wakeup request to the target AP device, so that the target AP device switches to an awake state according to the wakeup request.

Step 105: Send a first AP activation success response to the terminal device.

In this way, because a wakeup server is added to a communications system, when a terminal device needs to wake up an AP device, the wakeup server determines a corresponding target AP device, and wakes up the target AP device, which is not limited by a time or by a status of the AP device, thereby improving flexibility of a process of waking up the AP device.

An embodiment of the present application provides a method for waking up an AP device, where the method is applied to a terminal device. The terminal device may be an intelligent terminal having a cellular network access capability. The method includes the following steps.

Step 201: Send an AP activation request to a wakeup server, so that the wakeup server determines a target AP device according to the AP activation request, and when the target AP device is in a sleep state, wakes up the target AP device, where the AP activation request includes an identity of a terminal device.

Step 202: Receive an activation success response sent by the wakeup server.

In this way, when a terminal device needs to wake up an AP device, the terminal device sends an AP activation request to a wakeup server, so that the wakeup server determines a corresponding target AP device and wakes up the target AP device, which is not limited by a time or by a status of the AP device, thereby improving flexibility of a process of waking up the AP device.

Figure 3:
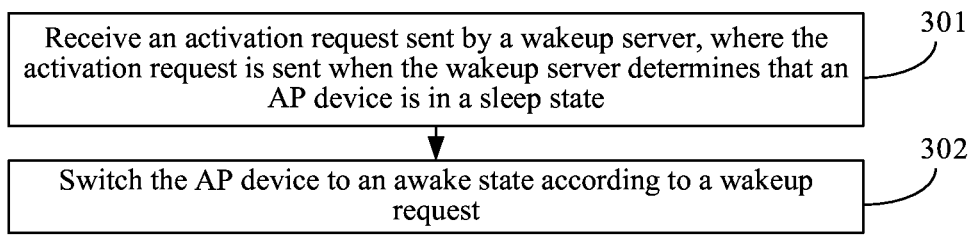
FIG. 3 is a flowchart of still another method for waking up an AP device according to an embodiment of the present application.

An embodiment of the present application provides a method for waking up an AP device, where the method is applied to an AP device, for example, the AP device may be a wireless broadband router. As shown in FIG. 3, the method includes the following steps.

Step 301: Receive an activation request sent by a wakeup server, where the activation request is sent when the wakeup server determines that an AP device is in a sleep state.

Step 302: Switch the AP device to an awake state according to a wakeup request.

In this way, when a terminal device needs to wake up an AP device, the AP device receives an activation request sent by a wakeup server, and switches to an awake state according to a wakeup request, where the activation request is sent when the wakeup server determines that the AP device is in a sleep state, which is not limited by a time or by a status of the AP device, thereby improving flexibility of a process of waking up the AP device.

Figure 4:
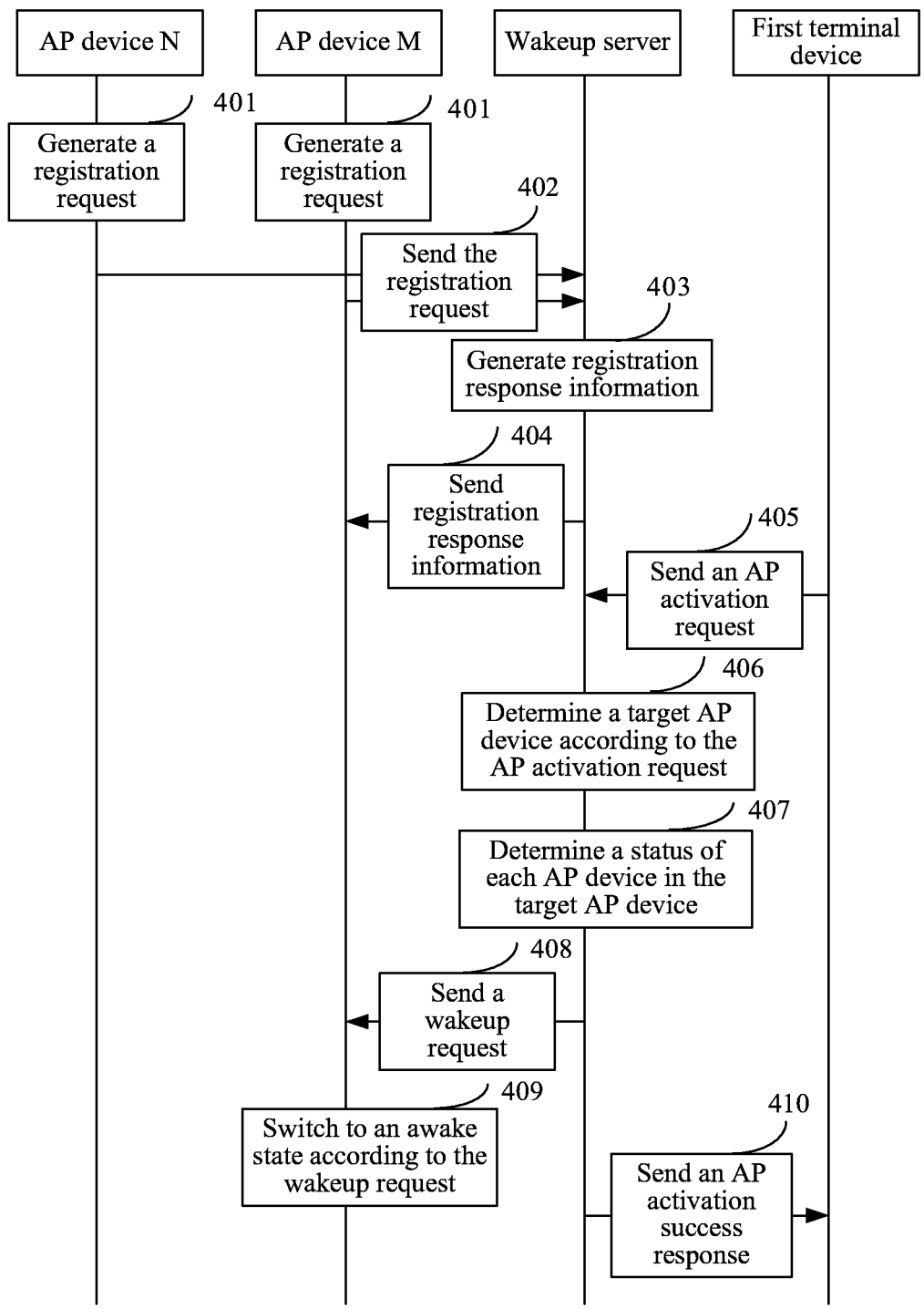
FIG. 4 is a flowchart of yet another method for waking up an AP device according to an embodiment of the present application.

In a communications system provided by an embodiment of the present application, one wakeup server, multiple AP devices, and multiple terminal devices may be set. An example of an AP device M, an AP device N, and a first terminal device is used in this embodiment of the present application. As shown in FIG. 4, a method for waking up an AP device provided by this embodiment of the present application includes the following steps.

Step 401: A first AP device generates a registration request.

The first AP device is at least one AP device in a management range of the wakeup server, and in this embodiment of the present application, it is assumed that the first AP device includes the AP device M and the AP device N.

It should be noted that, the registration request includes an identity of the AP device and a wakeup address of the AP device, and the registration request may further include location information of the AP device. The registration request may further include an authorized wakeup list, and the authorized wakeup list records an identity of a terminal device that is allowed to wake up the AP device and an authentication parameter of the terminal device. An identity of the first AP device is used for identifying the first AP device, a wakeup address of the first AP device is used for uniquely identifying a communication address for waking up the first AP device, and the location information of the AP device is used for identifying a geographic location of the AP device, where the location information of the AP device is generally coordinates of a geographic location of the AP device.

The registration request may further include the authorized wakeup list, and the authorized wakeup list records the identity of the terminal device that is allowed to wake up the AP device and the authentication parameter of the terminal device. For example, each entry in the authorized wakeup list may include an identity of a terminal device and an authentication parameter of the terminal device. Generally, the identity of the terminal device is used for uniquely identifying the terminal device, and may be a MAC address, or a character string for uniquely identifying the terminal device. The authentication parameter is related authentication information of a terminal device that is allowed to wake up the first AP device, for example, the authentication parameter may be a password that is preset by an owner of the AP device. For example, the authorized wakeup list of the first AP device is shown in Table 1, a first MAC address is 0x00E001000003, a corresponding authentication parameter is 123456, a second MAC address is 0x00E001000001, and a corresponding authentication parameter is 456789.

TABLE 1

| Identity of a terminal device | Authentication parameter |
|---|---|
| 0x00E001000003 | 123456 |
| 0x00E001000001 | 456789 |

It should be noted that, information in the registration request may be generated by the first AP device itself, or may be configured by a user of the first AP device, for example, a user logs, by using a network client, in to a network service module (Web Server) built in the first AP device, so as to configure the information. Particularly, if a location module is disposed in the first AP device, the location information of the first AP device may be automatically acquired by the location module.

Step 402: The first AP device sends the registration request to a wakeup server.

It should be noted that, after receiving the registration request sent by the first AP device, the wakeup server saves the information carried in the registration request of the first AP device.

The registration request includes the identity of the AP device and the wakeup address of the AP device. The identity of the first AP device is used for identifying the first AP device. When the identity, which is received by the wakeup server, of the first AP device is the same as an identity locally saved by the wakeup server, the wakeup server may allocate a new identity to the first AP device, so as to uniquely identify the first AP device in the wakeup server, and in a subsequent process of information exchange between the first AP device and the wakeup server, the first AP device may carry the new identity. When the identity, which is received by the wakeup server, of the first AP device is not the same as any identity locally saved by the wakeup server, the wakeup server may still use the identity of the first AP device as an identity in the wakeup server.

The wakeup address of the first AP device is used for uniquely identifying a communication address for waking up the first AP device. Generally, when the first AP device is in a sleep state, one wakeup communications module is still in an awake state, and the wakeup address of the first AP device is an address of the wakeup communications module.

When the wakeup server sends a wakeup request to the wakeup communications module, the wakeup communications module sends an activation signal to a sleeping module in the first AP device, so that the first AP device as a whole presents an awake state.

Step 403: The wakeup server generates registration response information.

Step 404: The wakeup server sends the registration response information to the first AP device.

In this embodiment, it is assumed that the first AP device includes the AP device M and the AP device N. Generally, after the first AP device receives the registration response information sent by the wakeup server, it indicates that the first AP device is successfully registered.

Step 405: The first terminal device sends an AP activation request to the wakeup server.

When the first terminal device needs to access a wireless fidelity (WiFi) network, a corresponding AP device needs to be woken up to provide a WIFI access function for the first terminal device. Therefore, the first terminal device sends an AP activation request to the wakeup server, so that the wakeup server determines a target AP device according to the AP activation request, and when the target AP device is in a sleep state, the first terminal device wakes up the target AP device, where the AP activation request includes an identity of the terminal device, where the identity is used for uniquely identifying the first terminal device in the communications system, so that the wakeup server identifies the first terminal device. Optionally, the AP activation request may further include at least one of a target AP device list and location determining information, where the target AP device list records an identity of at least one target AP device, and the location determining information includes location information of the terminal device, a wakeup distance range, and a maximum quantity of APs that are to be woken up. Optionally, the AP activation request may further include an authentication parameter of the terminal device. In this embodiment of the present application, the terminal device may communicate with the wakeup server by using a cellular network.

Step 406: The wakeup server determines a target AP device according to the AP activation request.

Optionally, when the AP activation request includes the target AP device list, the wakeup server may first determine a to-be-selected AP device, and then determines, in the to-be-selected AP device, that an AP device corresponding to an identity, which is recorded in the target AP device list, of a target AP device is the target AP device. There may be one or more target AP devices. For example, determined to-be-selected AP devices are an AP device E, an AP device G, an AP device H, an AP device M, and an AP device N, and the target AP device list records an identity of the AP device M, an identity of the AP device N, and an identity of an AP device L. Because AP devices that are in the AP device E, the AP device G, the AP device H, the AP device M, and the AP device N and are in the AP devices corresponding to the identities, which are recorded in the target AP device list, of the target AP devices are the AP device M and the AP device N, the AP devices corresponding to the identity of the AP device M and the identity of the AP device N are acquired as target AP devices, that is, final target AP devices are the AP device M and the AP device N.

Optionally, when the registration request of the first AP device includes location information of the first AP device, and the AP activation request includes the location determining information, the wakeup server may determine a to-be-selected AP device; then determine, in the to-beselected AP device according to the location information of the terminal device and location information, which is recorded by the wakeup server, of an AP device, that an AP device that is away from the terminal device by a distance within the wakeup distance range is a candidate target AP device; and determine, in the candidate target AP device, that the former T AP devices having optimal quality of service are target AP devices, where T is less than or equal to a threshold of the quantity of APs that are to be woken up. For example, the wakeup distance range in the AP activation request is 0 meters to 50 meters, and it is determined, in the to-be-selected AP devices according to location information of the first terminal device and the location information, which is recorded by the wakeup server, of the AP device, that a distance between each of the AP device M, the AP device N, and an AP device L and the first terminal device is within the wakeup distance range; it is assumed that the threshold of the quantity of APs that are to be woken up is 2, the AP device M, the AP device N, and the AP device L may be sorted according to quality of service in a descending order, and the former two AP devices having optimal quality of service are selected from the AP device M, the AP device N, and the AP device L as the target AP devices. Particularly, if the threshold of the quantity of APs that are to be woken up is 3, it may be directly determined that the AP device M, the AP device N, and the AP device L are the target AP devices.

Particularly, the AP activation request may include both the target AP device list and the location determining information. In an actual application, a use priority of the target AP device list is higher than a use priority of the location determining information. When the wakeup server acquires the target AP device according to the AP activation request, an AP device corresponding to an identity, which is recorded in the target AP device list, of a target AP device may be preferentially acquired from the to-be-selected AP device as the target AP device. However, when the target AP device recorded in the target AP device list is not in the to-be-selected AP device, or an entry of the target AP device list is empty, a target AP device is acquired from the to-be-selected AP device according to the location determining information.

Optionally, the registration request of the AP device may further include the authorized wakeup list, and the authorized wakeup list records the identity of the terminal device that is allowed to wake up the AP device and the authentication parameter of the terminal device. When the registration request of the first AP device includes the authorized wakeup list, the wakeup server needs to authenticate a terminal device requesting accessing the first AP device, and a terminal device is allowed to wake up the first AP device only when authentication succeeds. For example, each entry in the authorized wakeup list may include an identity of a terminal device and an authentication parameter of the terminal device. For example, the identity of the terminal device may be a MAC address, and the authentication parameter is related authentication information of the terminal device that is allowed to wake up the first AP device, for example, the authentication parameter may be a password that is preset by an owner of the AP device.

When an AP device needing to authenticate the terminal device exists in an AP device served by the wakeup server, the to-be-selected AP device may be a registered AP device allowing waking up by the first terminal device. The registered AP device allowing waking up by the terminal device may be classified into two types: one is an AP device that needs to authenticate a terminal device, and the other one is an AP device that does not need to authenticate a terminal device.

When the AP device needs to authenticate the first terminal device, specifically, the AP activation request needs to include an authentication parameter of the first terminal device, and wakeup server queries, according to the authentication parameter of the first terminal device and the identity of the first terminal device that are in the AP activation request, the authorized wakeup list recorded by the wakeup server, and performs matching between the authentication parameter of the terminal device in the AP activation request and the authentication parameter, which is recorded in the authorized wakeup list saved by the wakeup server, of the terminal device that is allowed to wake up the AP device; performs matching between the identity of the terminal device in the AP activation request and the identity, which is recorded in the authorized wakeup list saved by the wakeup server, of the terminal device that is allowed to wake up the AP device; and when an authorized wakeup list in which an authentication parameter and an identity of a terminal device are both the same as the authentication parameter and the identity of the terminal device in the AP activation request exists in the authorized wakeup list saved by the wakeup server, acquires an AP device providing the authorized wakeup list as the to-be-selected AP device. For example, when the authorized wakeup list of the first AP device is shown in Table 1, and in the AP activation request of the first terminal device, the identity of the first terminal device is 0x00E001000003, and the authentication parameter is 123456. Because a first MAC address of 0x00E001000003 exists in an entry of the authorized wakeup list of the first AP device, and a corresponding authentication parameter is 123456, the first terminal device is a device that is allowed to wake up the first AP device. In this embodiment of the present application, the wakeup server performs double matching on the identity of the terminal device and the authentication parameter of the terminal device, which improves security and accuracy of authentication.

When the AP device does not need to authenticate the first terminal device, that is, the registration request further includes a public identifier, and the public identifier indicates that the first AP device allows waking up by any terminal device, which indicates that the AP device allows waking up by any terminal device. The wakeup server may directly acquire the AP device allowing waking up by any terminal device as the to-be-selected AP device, that is, acquire an AP device whose registration request carries the public identifier as the to-be-selected AP device.

Step 407: The wakeup server determines a status of each AP device in the target AP device.

It should be noted that, when a status of an AP device registered in the wakeup server changes, for example, the AP device switches from a sleep state to an awake state, the AP device needs to generate status update information, where the status update information includes an updated status of the AP device; and then sends the status update information to the wakeup server, so that the wakeup server records the updated status of the AP device. When a wakeup address of the AP device registered in the wakeup server changes, the AP device may also generate status update information, where the status update information includes an updated wakeup address of the AP device; and then sends the status update information to the wakeup server, so that the wakeup server records the updated wakeup address of the AP device, which therefore ensures consistency between a status recorded by the wakeup server and a status of the first AP device.

Because the wakeup server records a real-time status of each registered AP device, the wakeup server may query a status of each AP device in the target AP device in locally saved statuses of AP devices.

It is assumed in the present application that the AP device M in the first AP device is in a sleep state, and the AP device N is in an awake state.

Step 408: The wakeup server sends a wakeup request to an AP device M.

Specifically, the wakeup server may wake up the AP device M by sending the wakeup request to a wakeup address of the AP device M, where the wakeup address of the AP device M is an address of a wakeup communications module, which is configured to wake up the AP device M, in the AP device M. Particularly, if the AP device M is a wireless broadband home router, and the wakeup communications module in the AP device M is generally a software module running on a main processor of the AP device M, or may be a hardware module that can implement a corresponding function, or may be specifically an Ethernet module or an asymmetric digital subscriber line modem (ADSL modem) configured to access the Internet, each time when the AP device M is powered on, a temporary external IP address is generally allocated to the AP device M, and the temporary external IP address can be used as the wakeup address of the AP device M. Each time when the temporary external IP address changes, the AP device M needs to update registration information to the wakeup server.

Particularly, the AP device M may autonomously sleep according to a preset sleep condition, for example, the preset sleep condition may be that a preset sleep time for the AP device M is reached, or a time when the AP device M is continuously idle exceeds a preset threshold, where being continuously idle refers to that no terminal device is associated with the AP device M; and returns a response packet. After receiving the response packet, the AP device M can enter a sleep state, until being woken up.

After the AP device M is registered, each time when the status of the AP device M is updated, for example, the AP device M switches from a sleep state to an awake state or the wakeup address changes, the status update information needs to be sent to notify the wakeup server, where the status update information includes the updated status of the AP device M or the updated wakeup address of the AP device M. After receiving the status update information, the wakeup server records the updated status of the AP device M or the updated wakeup address of the AP device M, which therefore ensures consistency between the status recorded by the wakeup server and the status of the AP device M. Particularly, if the AP device M needs to switch from an awake state to a sleep state, before switching the AP device to a sleep state, the AP device M first needs to send the status update information to the wakeup server, where the status update information may include the identity of the AP device M and the changed status of the AP device M, that is, a sleep state, and then the AP device M switches to a sleep state.

Step 409: The AP device M switches to an awake state according to the wakeup request.

After receiving the wakeup request, the wakeup communications module of the AP device M sends an activation signal to a sleeping module in the AP device M, so that the AP device M as a whole presents an awake state.

Step 410: The wakeup server sends an AP activation success response to the first terminal device.

Because the status of the AP device M switches to an awake state, the wakeup server may send the first AP activation success response to the first terminal device.

Because the AP device N is in an awake state, the wakeup server may directly send a second AP activation success response to the first terminal device.

The first AP activation success response and the second AP activation success response may be sent by using a same packet, or may be sent by using different packets, which is not limited in the present application. Therefore, the AP activation success response includes at least one of the first AP activation success response and the second AP activation success response.

It should be noted that, in step 406, if an AP device corresponding to an identity, which is recorded in the target AP device list, of a target AP device is not in the to-be-selected AP device, for example, an AP device corresponding to an identity, which is recorded in the target AP device list, of an AP device X is not registered in the wakeup server, the wakeup server needs to send a wakeup failure response to the first terminal device, where the wakeup failure response indicates that waking up of the AP device corresponding to the identity of the AP device X fails; the wakeup failure response may be sent by using a single packet, or may be sent by using the packet which is used for sending the first AP activation success response and the second AP activation success response, which is not limited in the present application.

Preferably, after wakeup success responses and wakeup failure responses are all generated, the wakeup server may send all the wakeup success responses and wakeup failure responses together by using a same packet, which therefore can effectively reduce channel resources.

It should be noted that, an order of the steps of the method for waking up an AP device provided by this embodiment of the present application may be properly adjusted, and steps may also be increased or decreased according to cases. Any varied method readily figured out by a person skilled in the art within the technical scope disclosed in the present application shall fall within the protection scope of the present application, which is not described herein again. In the foregoing process in which the first terminal device communicates with the wakeup server, and in the process in which the first AP device communicates with the wakeup server, the first terminal device and the first AP device first need to acquire a specific IP address of the wakeup server. For a process of acquiring the address, refer to the prior art, which is not limited in the present application. The specific IP address may be a static external IP address, or may be a static external IP address, as long as a terminal device and an AP device that are in a management range of the wakeup server can acquire the specific IP address.

According to the method for waking up an AP device provided by this embodiment of the present application, because a wakeup server is added to a communications system, when a terminal device needs to wake up an AP device, the wakeup server determines a corresponding target AP device, and wakes up the target AP device, so that access to a WIFI network is not limited by a time or by a status of the AP device, thereby improving flexibility of a process of waking up the AP device.

Figure 5:
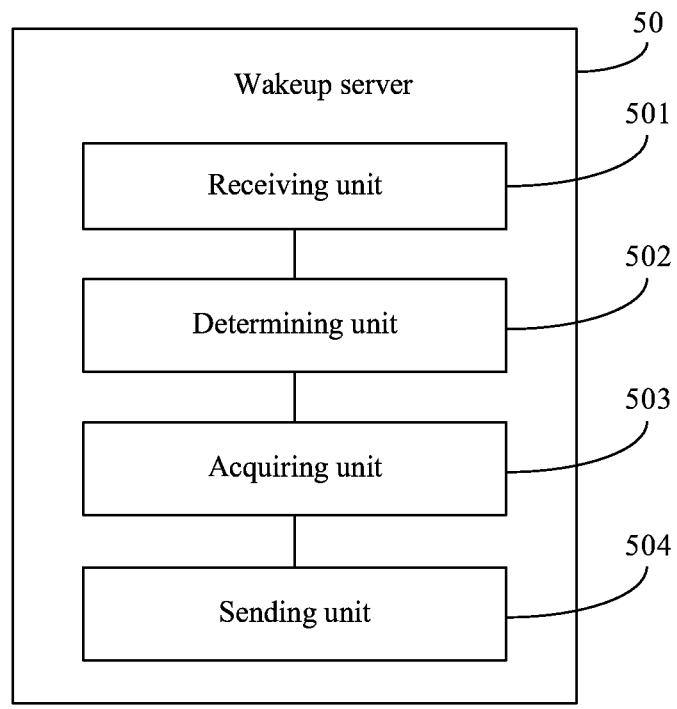
FIG. 5 is a schematic structural diagram of a wakeup server according to an embodiment of the present application.

An embodiment of the present application provides a wakeup server. The wakeup server is a server having a specific Internet Protocol (IP) address, and the specific IP address may be a static external IP address, or may be a static internal IP address, as long as a terminal device and an AP device that are in a management range of the wakeup server can acquire the specific IP address. As shown in FIG. 5, the wakeup server includes: a receiving unit 501, configured to receive an AP activation request sent by a terminal device, where the AP activation request includes an identity of the terminal device, and the identity of the terminal device is used for uniquely identifying a first terminal device in a communications system, so that the wakeup server identifies the first terminal device; a determining unit 502, configured to determine a target AP device according to the AP activation request received by the receiving unit 501; an acquiring unit 503, configured to acquire a status of the target AP device; and a sending unit 504, configured to: when the target AP device is in a sleep state, send a wakeup request to the target AP device, so that the target AP device switches to an awake state according to the wakeup request.

The sending unit 504 is further configured to send a first AP activation success response to the terminal device.

In this way, because a wakeup server is added to a communications system, when the terminal device needs to wake up an AP device, the determining unit determines a corresponding target AP device, and the sending unit wakes up the target AP device, which is not limited by a time or by a status of the AP device, thereby improving flexibility of a process of waking up the AP device.

It should be noted that, after receiving a registration request sent by the AP device, the wakeup server saves information carried in the registration request of the AP device.

The sending unit 504 is further configured to: when the target AP device is in an awake state, send a second AP activation success response to the terminal device.

The receiving unit 501 is further configured to: receive a registration request of the first AP device, where the first AP device is at least one AP device in the management range of the wakeup server, and the registration request includes an identity of the first AP device and a wakeup address of the first AP device.

The identity of the first AP device is used for identifying the first AP device. When the identity, which is received by the wakeup server, of the first AP device is the same as an identity locally saved by the wakeup server, the wakeup server may allocate a new identity to the first AP device, so as to uniquely identify the first AP device in the wakeup server, and in a subsequent process of information exchange between the first AP device and the wakeup server, the first AP device may carry the new identity. When the identity, which is received by the wakeup server, of the first AP device is different from any identity locally saved by the wakeup server, the wakeup server may still use the identity of the first AP device as an identity in the wakeup server.

The wakeup address of the first AP device is used for uniquely identifying a communication address for waking up the first AP device. Generally, when the first AP device is in a sleep state, one wakeup communications module is still in an awake state, and the wakeup address of the first AP device is an address of the wakeup communications module. When the wakeup server sends the wakeup request to the wakeup communications module, the wakeup communications module sends an activation signal to a sleeping module in the first AP device, so that the first AP device as a whole presents an awake state.

The sending unit 504 is further configured to send registration response information to the first AP device.

The AP activation request further includes at least one of a target AP device list and location determining information, where the target AP device list records an identity of at least one target AP device, and the location determining information includes location information of the terminal device, a wakeup distance range, and a maximum quantity of APs that are to be woken up.

Figure 6:
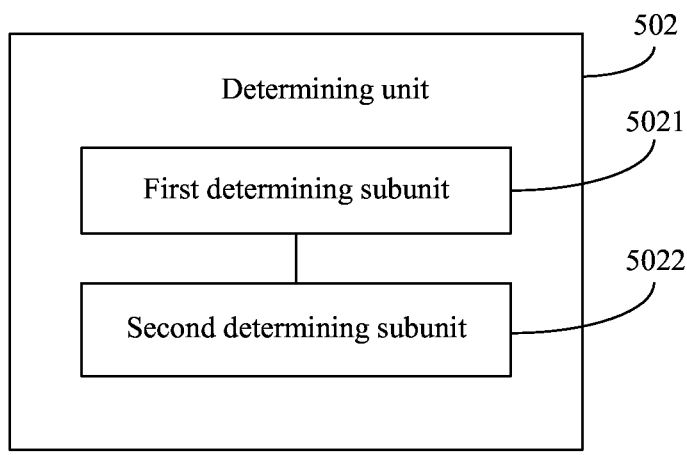
FIG. 6 is a schematic structural diagram of a determining unit according to an embodiment of the present application.

Optionally, when the AP activation request includes the target AP device list, as shown in FIG. 6, the determining unit 502 specifically includes: a first determining subunit 5021, configured to determine a to-be-selected AP device; and a second determining subunit 5022, configured to determine, in the to-be-selected AP device, that an AP device corresponding to an identity, which is recorded in the target AP device list, of a target AP device is the target AP device, where, for example, acquired to-be-selected AP devices are an AP device E, an AP device G, an AP device H, an AP device M, and an AP device N, and the target AP device list records an identity of the AP device M, an identity of the AP device N, and an identity of an AP device L, AP devices corresponding to the identity of the AP device M and the identity of the AP device N are acquired as target AP devices, that is, final target AP devices are the AP device M and the AP device N.

Figure 7:
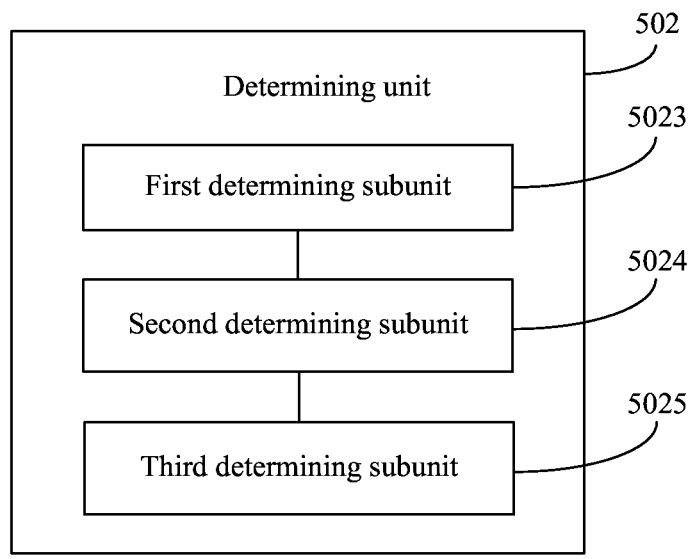
FIG. 7 is a schematic structural diagram of another determining unit according to an embodiment of the present application.

Optionally, when the registration request of the first AP device includes location information of the first AP device, and the AP activation request includes the location determining information, as shown in FIG. 7, the determining unit 502 specifically includes:

a first determining subunit 5023, configured to determine a to-be-selected AP device; a second determining subunit 5024, configured to determine, in the to-be-selected AP device according to the location information of the terminal device and location information, which is recorded by the wakeup server, of an AP device, that an AP device that is away from the terminal device by a distance within the wakeup distance range is a candidate target AP device; and a third determining subunit 5025, configured to determine, in the candidate target AP device, that the former T AP devices having optimal quality of service are target AP devices, where T is less than or equal to a threshold of the quantity of APs that are to be woken up, where, for example, the wakeup distance range in the AP activation request is 0 meters to 50 meters, and it is determined, in the to-be-selected AP devices according to location information of the first terminal device and the location information, which is recorded by the wakeup server, of the AP device, that a distance between each of the AP device M, the AP device N, and an AP device L and the first terminal device is within the wakeup distance range; it is assumed that the threshold of the quantity of APs that are to be woken up is 2, the AP device M, the AP device N, and the AP device L may be sorted according to quality of service in a descending order, and the former two AP devices having optimal quality of service are selected from the AP device M, the AP device N, and the AP device L as the target AP devices. Particularly, if the threshold of the quantity of APs that are to be woken up is 3, it may be directly determined that the AP device M, the AP device N, and the AP device L are the target AP devices.

The registration request further includes an authorized wakeup list, and the authorized wakeup list records an identity of a terminal device that is allowed to wake up the first AP device and an authentication parameter of the terminal device.

Particularly, the AP activation request may include both the target AP device list and the location determining information. When the wakeup server acquires the target AP device according to the AP activation request, an AP device corresponding to an identity, which is recorded in the target AP device list, of a target AP device may be preferentially acquired from the to-be-selected AP device as the target AP device. However, when the target AP device recorded in the target AP device list is not in the to-be-selected AP device, or an entry of the target AP device list is empty, a target AP device is acquired from the to-be-selected AP device according to the location determining information.

The AP activation request further includes the authentication parameter of the terminal device, and the first determining subunit 5021 or the first determining subunit 5023 is specifically configured to: perform matching between the authentication parameter of the terminal device in the AP activation request and the authentication parameter, which is recorded in the authorized wakeup list saved by the wakeup server, of the terminal device that is allowed to wake up the AP device; perform matching between the identity of the terminal device in the AP activation request and the identity, which is recorded in the authorized wakeup list saved by the wakeup server, of the terminal device that is allowed to wake up the AP device; and when an authorized wakeup list in which an authentication parameter and an identity of a terminal device are both the same as the authentication parameter and the identity of the terminal device in the AP activation request exists in the authorized wakeup list saved by the wakeup server, acquire an AP device providing the authorized wakeup list as the to-be-selected AP device. For example, when the authorized wakeup list of the first AP device is shown in Table 1, and in the AP activation request of the first terminal device, the identity of the first terminal device is 0x00E001000003, and the authentication parameter is 123456. Because a first MAC address of 0x00E001000003 exists in an entry of the authorized wakeup list of the first AP device, and a corresponding authentication parameter is 123456, the first terminal device is a device that is allowed to wake up the first AP device.

The registration request further includes a public identifier, the public identifier indicates that the first AP device allows waking up by any terminal device, and the first determining subunit 5021 is specifically configured to acquire an AP device allowing waking up by any terminal device as the to-be-selected AP device.

The receiving unit 501 is further configured to receive status update information sent by the first AP device, where the status update information includes an updated status of the AP device.

Figure 8:
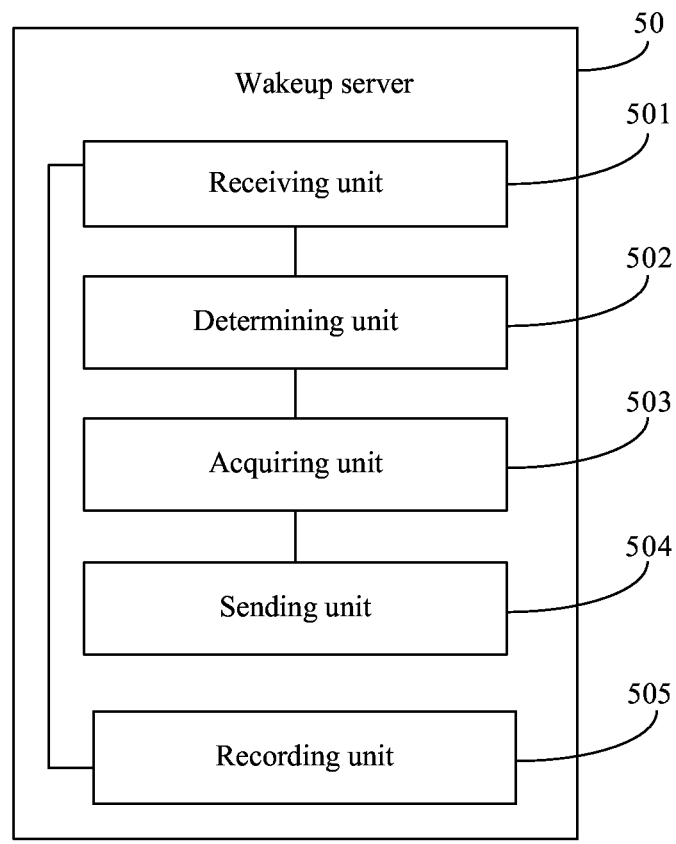
FIG. 8 is a schematic structural diagram of another wakeup server according to an embodiment of the present application.

As shown in FIG. 8, the wakeup server 50 further includes: a recording unit 505, configured to record the updated status of the AP device.

In this embodiment of the present application, because a wakeup server is added to a communications system, when a terminal device needs to wake up an AP device, the determining unit determines a corresponding target AP device, and the sending unit wakes up the target AP device, which is not limited by a time or by a status of the AP device, thereby improving flexibility of a process of waking up the AP device.

Figure 9:
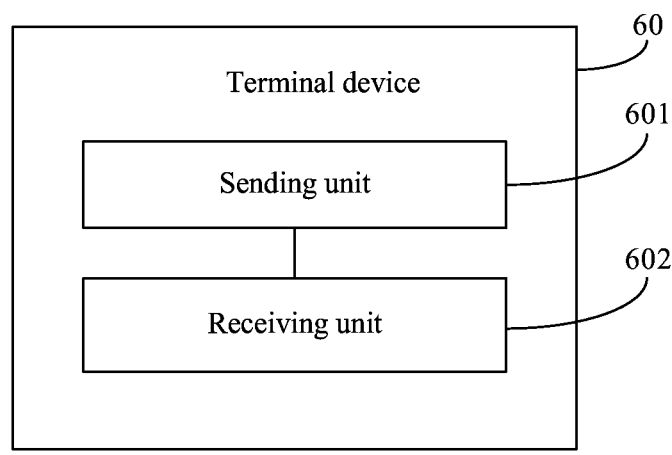
FIG. 9 is a schematic structural diagram of a terminal device according to an embodiment of the present application.

An embodiment of the present application provides a terminal device 60, and as shown in FIG. 9, the terminal device 60 includes: a sending unit 601, configured to send an AP activation request to a wakeup server, so that the wakeup server determines a target AP device according to the AP activation request, and when the target AP device is in a sleep state, wakes up the target AP device, where the AP activation request includes an identity of the terminal device, and the identity of the terminal device is used for uniquely identifying a first terminal device in a communications system, so that the wakeup server identifies the first terminal device; and a receiving unit 602, configured to receive an activation success response sent by the wakeup server.

In this way, when a terminal device needs to wake up an AP device, the sending unit sends an AP activation request to a wakeup server, so that the wakeup server determines a corresponding target AP device and wakes up the target AP device, which is not limited by a time or by a status of the AP device, thereby improving flexibility of a process of waking up the AP device.

The AP activation request further includes at least one of a target AP device list and location determining information, where the target AP device list records an identity of at least one target AP device, and the location determining information includes location information of the terminal device, a wakeup distance range, and a maximum quantity of APs that are to be woken up.

The AP activation request further includes an authentication parameter of the terminal device.

In this embodiment of the present application, when a terminal device needs to wake up an AP device, the sending unit sends an AP activation request to a wakeup server, so that the wakeup server determines a corresponding target AP device and wakes up the target AP device, which is not limited by a time or by a status of the AP device, thereby improving flexibility of a process of waking up the AP device.

Figure 10:
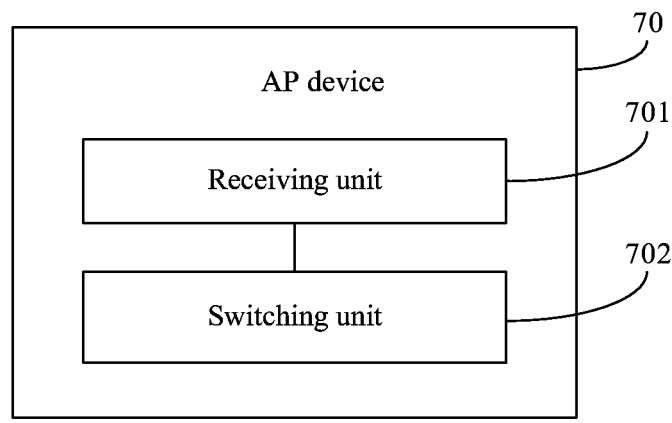
FIG. 10 is a schematic structural diagram of an AP device according to an embodiment of the present application.

An embodiment of the present application provides an AP device 70, which, as shown in FIG. 10, includes: a receiving unit 701, configured to receive an activation request sent by a wakeup server, where the activation request is sent when the wakeup server determines that the AP device is in a sleep state; and a switching unit 702, configured to switch the AP device to an awake state according to a wakeup request.

In this way, when a terminal device needs to wake up an AP device, the receiving unit receives an activation request sent by a wakeup server, and the switching unit switches to an awake state according to a wakeup request, which is not limited by a time or by a status of the AP device, thereby improving flexibility of a process of waking up the AP device.

Figure 11:
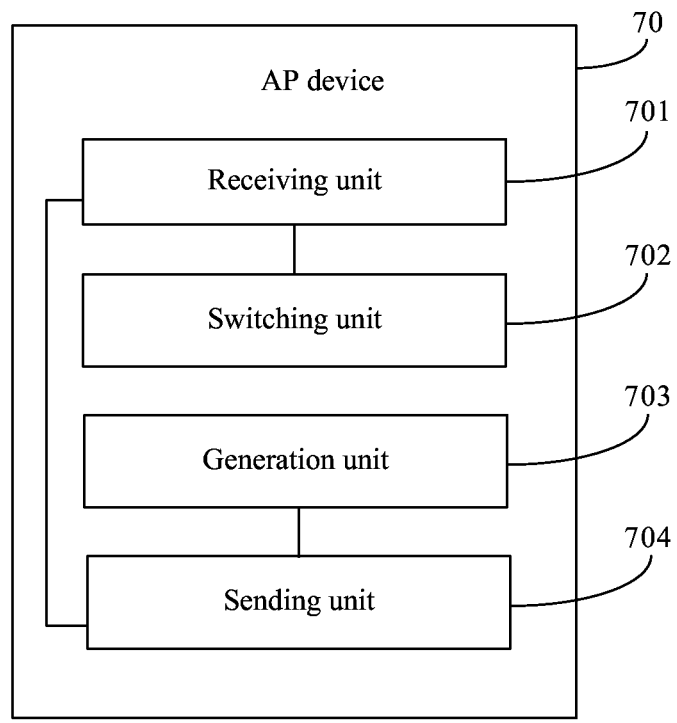
FIG. 11 is a schematic structural diagram of another AP device according to an embodiment of the present application.

Further, as shown in FIG. 11, the AP device 70 further includes: a generation unit 703, configured to generate a registration request, where the registration request includes an identity of the AP device and a wakeup address of the AP device. An identity of a first AP device is used for identifying the first AP device, a wakeup address of the first AP device is used for uniquely identifying a communication address for waking up the first AP device, and location information of the AP device is used for identifying a geographic location of the AP device, where the location information of the AP device is generally coordinates of the geographic location of the AP device; and a sending unit 704, configured to send the registration request to the wakeup server, so that when the AP device needs to be woken up, the wakeup server sends the wakeup request to the AP device according to the registration request.

The receiving unit 701 is further configured to receive registration response information sent by the wakeup server.

The registration request further includes the location information of the AP device.

The registration request further includes an authorized wakeup list, and the authorized wakeup list records an identity of a terminal device that is allowed to wake up the AP device and an authentication parameter of the terminal device.

It should be noted that, information in the registration request may be generated by the first AP device itself, or may be configured by a user of the first AP device, for example, a user logs, by using a network client, in to a network service module (Web Server) built in the first AP device, so as to configure the information. Particularly, if a location module is disposed in the first AP device, location information of the first AP device may be automatically acquired by the location module.

The generation unit 703 is further configured to: when a status of the AP device changes, generate status update information, where the status update information includes an updated status of the AP device.

The sending unit 704 is further configured to send the status update information to the wakeup server, so that the wakeup server records the updated status of the AP device.

In this embodiment of the present application, when a terminal device needs to wake up an AP device, the receiving unit receives an activation request sent by a wakeup server, and the switching unit switches to an awake state according to a wakeup request, which is not limited by a time or by a status of the AP device, thereby improving flexibility of a process of waking up the AP device.

An embodiment of the present application provides a communications system, including: the wakeup server according to any one of the foregoing embodiments, where the wakeup server is configured to: receive an AP activation request sent by a terminal device, where the AP activation request includes an identity of the terminal device; determine a target AP device according to the AP activation request; acquire a status of the target AP device; when the target AP device is in a sleep state, send a wakeup request to the target AP device, so that the target AP device switches to an awake state according to the wakeup request; and send a first AP activation success response to the terminal device; the terminal device according to any one of the foregoing embodiments, where the terminal device is configured to: send an AP activation request to a wakeup server, so that the wakeup server determines a target AP device according to the AP activation request, and when the target AP device is in a sleep state, wakes up the target AP device, where the AP activation request includes an identity of the terminal device; and receive an activation success response sent by the wakeup server; and the AP device according to any one of the foregoing embodiments, where the AP device is configured to receive an activation request sent by a wakeup server, where the activation request is sent when the wakeup server determines that the AP device is in a sleep state; and switch the AP device to an awake state according to a wakeup request.

It may be clearly understood by a person skilled in the art that, for the purpose of convenient and brief description, for a detailed working process of the foregoing system, apparatus, and unit, refer to a corresponding process in the foregoing method embodiments, and no further details are provided herein again.

According to the communications system provided by this embodiment of the present application, because a wakeup server is added to the communications system, when a terminal device needs to wake up an AP device, the wakeup server determines a corresponding target AP device, and wakes up the target AP device, so that access to a WIFI network is not limited by a time or by a status of the AP device, thereby improving flexibility of a process of waking up the AP device.

Figure 12:
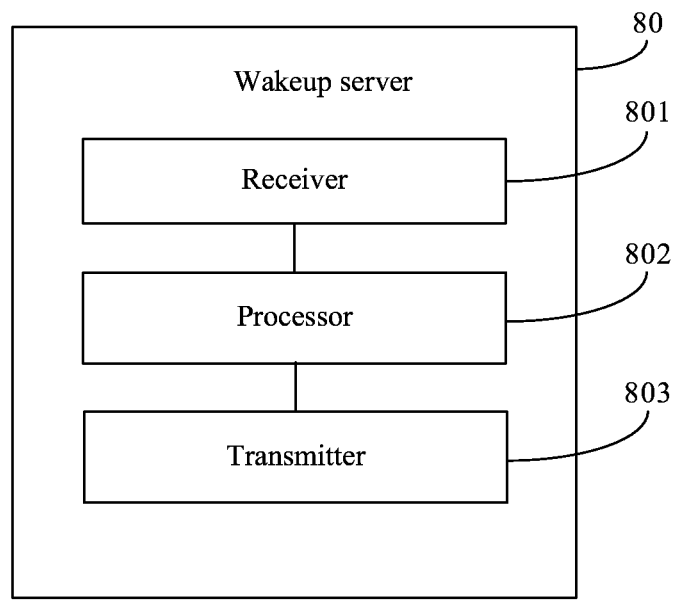
FIG. 12 is a schematic structural diagram of still another wakeup server according to an embodiment of the present application.

An embodiment of the present application provides a wakeup server 80, which, as shown in FIG. 12, includes: a receiver 801, configured to receive an AP activation request sent by a terminal device, where the AP activation request includes an identity of the terminal device, and the identity of the terminal device is used for uniquely identifying a first terminal device in a communications system, so that the wakeup server identifies the first terminal device; a processor 802, configured to determine a target AP device according to the AP activation request, where the processor 802 is further configured to acquire a status of the target AP device; and a transmitter 803, configured to: when the target AP device is in a sleep state, send a wakeup request to the target AP device, so that the target AP device switches to an awake state according to the wakeup request, where the transmitter 803 is further configured to send a first AP activation success response to the terminal device.

In this way, because a wakeup server is added to a communications system, when a terminal device needs to wake up an AP device, the processor determines a corresponding target AP device, and the transmitter wakes up the target AP device, which is not limited by a time or by a status of the AP device, thereby improving flexibility of a process of waking up the AP device.

It should be noted that, after receiving a registration request sent by the AP device, the wakeup server saves information carried in the registration request of the AP device.

The transmitter 803 is further configured to: when the target AP device is in an awake state, send a second AP activation success response to the terminal device.

The receiver 801 is further configured to receive a registration request of a first AP device, where the first AP device is at least one AP device in a management range of the wakeup server, and the registration request includes an identity of the first AP device and a wakeup address of the first AP device.

The identity of the first AP device is used for identifying the first AP device. When the identity, which is received by the wakeup server, of the first AP device is the same as an identity locally saved by the wakeup server, the wakeup server may allocate a new identity to the first AP device, so as to uniquely identify the first AP device in the wakeup server, and in a subsequent process of information exchange between the first AP device and the wakeup server, the first AP device may carry the new identity. When the identity, which is received by the wakeup server, of the first AP device is not the same as any identity locally saved by the wakeup server, the wakeup server may still use the identity of the first AP device as an identity in the wakeup server.

The wakeup address of the first AP device is used for uniquely identifying a communication address for waking up the first AP device. Generally, when the first AP device is in a sleep state, one wakeup communications module is still in an awake state, and the wakeup address of the first AP device is an address of the wakeup communications module. When the wakeup server sends the wakeup request to the wakeup communications module, the wakeup communications module sends an activation signal to a sleeping module in the first AP device, so that the first AP device as a whole presents an awake state.

The transmitter 803 is further configured to send registration response information to the first AP device.

The AP activation request further includes at least one of a target AP device list and location determining information, where the target AP device list records an identity of at least one target AP device, and the location determining information includes location information of the terminal device, a wakeup distance range, and a maximum quantity of APs that are to be woken up.

The AP activation request includes the target AP device list, and the processor 802 is specifically configured to: determine a to-be-selected AP device; and determine, in the to-be-selected AP device, that an AP device corresponding to an identity, which is recorded in the target AP device list, of a target AP device is the target AP device, where, for example, acquired to-be-selected AP devices are an AP device E, an AP device G, an AP device H, an AP device M, and an AP device N, and the target AP device list records an identity of the AP device M, an identity of the AP device N, and an identity of an AP device L, AP devices corresponding to the identity of the AP device M and the identity of the AP device N are acquired as target AP devices, that is, final target AP devices are the AP device M and the AP device N.

The registration request further includes location information of the first AP device, the AP activation request includes the location determining information, and the processor 802 is specifically configured to: determine a to-be-selected AP device; determine, in the to-be-selected AP device according to the location information of the terminal device and location information, which is recorded by the wakeup server, of an AP device, that an AP device that is away from the terminal device by a distance within the wakeup distance range is a candidate target AP device; and determine, in the candidate target AP device, that the former T AP devices having optimal quality of service are target AP devices, where T is less than or equal to a threshold of the quantity of APs that are to be woken up, where, for example, the wakeup distance range in the AP activation request is 0 meters to 50 meters, and it is determined, in the to-be-selected AP devices according to location information of the first terminal device and the location information, which is recorded by the wakeup server, of the AP device, that a distance between each of the AP device M, the AP device N, and an AP device L and the first terminal device is within the wakeup distance range; it is assumed that the threshold of the quantity of APs that are to be woken up is 2, the AP device M, the AP device N, and the AP device L may be sorted according to quality of service in a descending order, and the former two AP devices having optimal quality of service are selected from the AP device M, the AP device N, and the AP device L as the target AP devices; particularly, if the threshold of the quantity of APs that are to be woken up is 3, it may be directly determined that the AP device M, the AP device N, and the AP device L are the target AP devices.

The registration request further includes an authorized wakeup list, and the authorized wakeup list records an identity of a terminal device that is allowed to wake up the first AP device and an authentication parameter of the terminal device.

The AP activation request further includes an authentication parameter of the terminal device, and the processor 802 is specifically configured to: perform matching between the authentication parameter of the terminal device in the AP activation request and the authentication parameter, which is recorded in the authorized wakeup list saved by the wakeup server, of the terminal device that is allowed to wake up the AP device; perform matching between the identity of the terminal device in the AP activation request and the identity, which is recorded in the authorized wakeup list saved by the wakeup server, of the terminal device that is allowed to wake up the AP device; and when an authorized wakeup list in which an authentication parameter and an identity of a terminal device are both the same as the authentication parameter and the identity of the terminal device in the AP activation request exists in the authorized wakeup list saved by the wakeup server, acquire an AP device providing the authorized wakeup list as the to-be-selected AP device.

The registration request further includes a public identifier, and the public identifier indicates that the first AP device allows waking up by any terminal device, and the processor 802 is specifically configured to: acquire an AP device allowing waking up by any terminal device as the to-be-selected AP device.

The receiver 801 is further configured to receive status update information sent by the first AP device, where the status update information includes an updated status of the AP device.

The processor 802 is further configured to record the updated status of the AP device.

Figure 13:
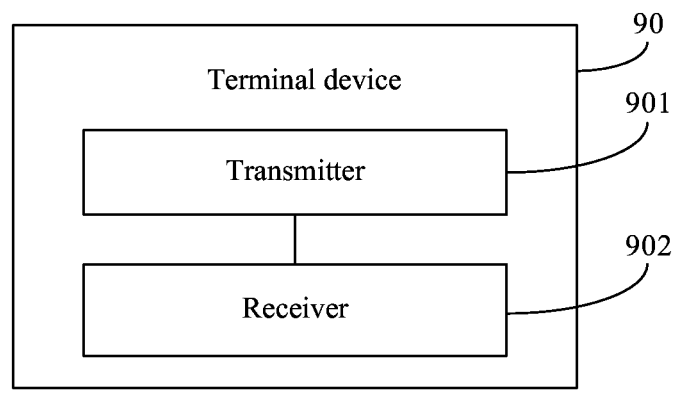
FIG. 13 is a schematic structural diagram of another terminal device according to an embodiment of the present application.

An embodiment of the present application provides a terminal device 90, and as shown in FIG. 13, the terminal device 90 includes: a transmitter 901, configured to send an AP activation request to a wakeup server, so that the wakeup server determines a target AP device according to the AP activation request, and when the target AP device is in a sleep state, wakes up the target AP device, where the AP activation request includes an identity of the terminal device; and a receiver 902, configured to receive an activation success response sent by the wakeup server.

In this way, when a terminal device needs to wake up an AP device, the transmitter sends an AP activation request to a wakeup server, so that the wakeup server determines a corresponding target AP device and wakes up the target AP device, which is not limited by a time or by a status of the AP device, thereby improving flexibility of a process of waking up the AP device.

The AP activation request further includes at least one of a target AP device list and location determining information, where the target AP device list records an identity of at least one target AP device, and the location determining information includes location information of the terminal device, a wakeup distance range, and a maximum quantity of APs that are to be woken up.

The AP activation request further includes an authentication parameter of the terminal device.

Figure 14:
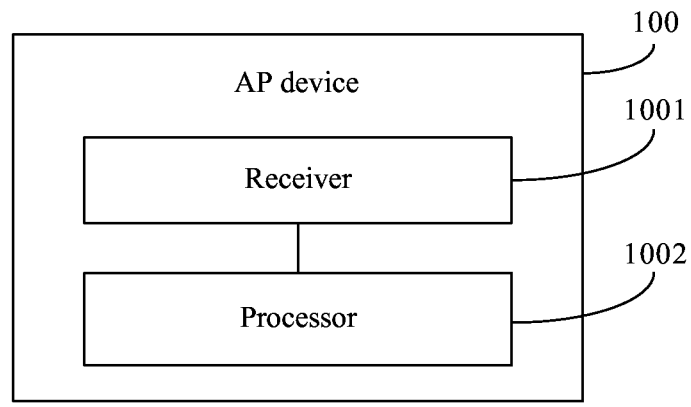
FIG. 14 is a schematic structural diagram of still another AP device according to an embodiment of the present application.

An embodiment of the present application provides an AP device 100, and as shown in FIG. 14, the AP device 100 includes: a receiver 1001, configured to receive an activation request sent by a wakeup server, where the activation request is sent when the wakeup server determines that the AP device is in a sleep state; and a processor 1002, configured to switch the AP device to an awake state according to a wakeup request.

In this way, when a terminal device needs to wake up an AP device, the receiver receives an activation request sent by a wakeup server, and the processor switches to an awake state according to a wakeup request, which is not limited by a time or by a status of the AP device, thereby improving flexibility of a process of waking up the AP device.

The processor 1002 is further configured to generate a registration request, where the registration request includes an identity of the AP device and a wakeup address of the AP device.

Figure 15:
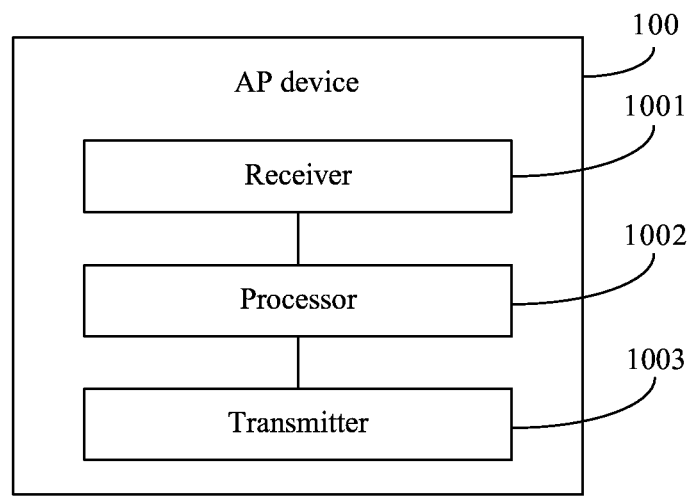
FIG. 15 is a schematic structural diagram of yet another AP device according to an embodiment of the present application.

Further, as shown in FIG. 15, the AP device 100 further includes: a transmitter 1003, configured to send the registration request to the wakeup server, so that when the AP device needs to be woken up, the wakeup server sends the wakeup request to the AP device according to the registration request.

The receiver 1001 is further configured to receive registration response information sent by the wakeup server.

The registration request further includes location information of the AP device.

The registration request further includes an authorized wakeup list, and the authorized wakeup list records an identity of a terminal device that is allowed to wake up the AP device and an authentication parameter of the terminal device.

The processor 1002 is further configured to: when a status of the AP device changes, generate status update information, where the status update information includes an updated status of the AP device.

The AP device 100 further includes: a transmitter, configured to send the status update information to the wakeup server, so that the wakeup server records the updated status of the AP device. The transmitter may be the same as the transmitter 1003 in FIG. 12, or may be different from the transmitter 1003 in FIG. 12, which is not limited in the present application.

An embodiment of the present application provides a communications system, including: the wakeup server according to any one of the foregoing embodiments, where the wakeup server is configured to: receive an AP activation request sent by a terminal device, where the AP activation request includes an identity of the terminal device; determine a target AP device according to the AP activation request; acquire a status of the target AP device; when the target AP device is in a sleep state, send a wakeup request to the target AP device, so that the target AP device switches to an awake state according to the wakeup request; and send a first AP activation success response to the terminal device; the terminal device according to any one of the foregoing embodiments, where the terminal device is configured to: send an AP activation request to a wakeup server, so that the wakeup server determines a target AP device according to the AP activation request, and when the target AP device is in a sleep state, wakes up the target AP device, where the AP activation request includes the identity of the terminal device; and receive an activation success response sent by the wakeup server; and the AP device according to any one of the foregoing embodiments, where the AP device is configured to receive an activation request sent by a wakeup server, where the activation request is sent when the wakeup server determines that the AP device is in a sleep state; and switch the AP device to an awake state according to a wakeup request.

It may be clearly understood by a person skilled in the art that, for the purpose of convenient and brief description, for a detailed working process of the foregoing system, apparatus, and unit, refer to a corresponding process in the foregoing method embodiments, and no further details are provided herein again.

According to the communications system provided by this embodiment of the present application, because a wakeup server is added to the communications system, when a terminal device needs to wake up an AP device, the wakeup server determines a corresponding target AP device, and wakes up the target AP device, so that access to a WIFI network is not limited by a time or by a status of the AP device, thereby improving flexibility of a process of waking up the AP device.

Figure 16:
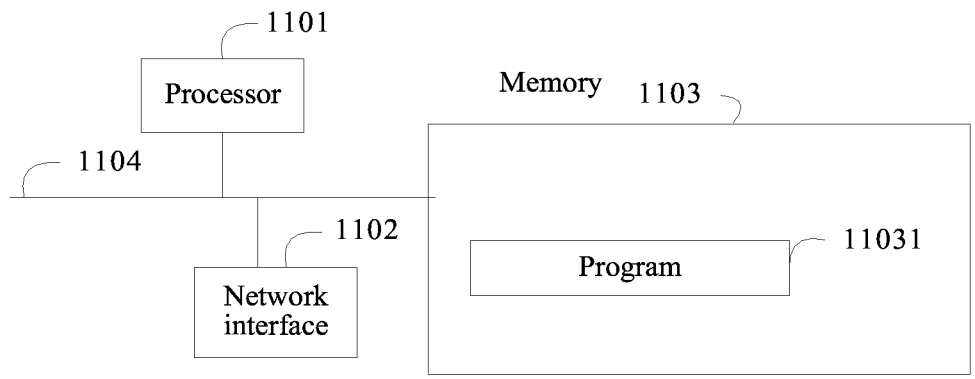
FIG. 16 is a schematic structural diagram of yet another wakeup server according to an embodiment of the present application.

FIG. 16 describes a structure of a wakeup server according to another embodiment of the present application, and the structure includes at least one processor 1101 (such as a CPU), at least one network interface 1102 or another communications interface, a memory 1103, and at least one communications bus 1104 that is configured to implement connection and communication between these apparatuses. The processor 1101 is configured to execute an executable module stored in the memory 1103, such as a computer program. The memory 1103 may include a high speed random access memory (RAM), and may also include a non-volatile memory, such as at least one magnetic disk storage. Communication connection among the at least one network interface, an AP device, and a terminal device is implemented by using at least one network interface 1102 (which may be wired or wireless), and the Internet, a wide area network, a local network, a metropolitan area network or the like may be used.

In some implementation manners, the memory 1103 stores a program 11031, the program 11031 may be executed by the processor 1101, and the program 11031 is configured to: receive an AP activation request sent by a terminal device, where the AP activation request includes an identity of the terminal device; determine a target AP device according to the AP activation request; acquire a status of the target AP device; when the target AP device is in a sleep state, sending a wakeup request to the target AP device, so that the target AP device switches to an awake state according to the wakeup request; send a first AP activation success response to the terminal device; and when the target AP device is in an awake state, send a second AP activation success response to the terminal device.

Before the receiving an AP activation request sent by a terminal device, the program is further configured to: receiving a registration request of a first AP device, where the first AP device is at least one AP device in a management range of the wakeup server, and the registration request includes an identity of the first AP device and a wakeup address of the first AP device; and sending registration response information to the first AP device.

The AP activation request further includes at least one of a target AP device list and location determining information, where the target AP device list records an identity of at least one target AP device, and the location determining information includes location information of the terminal device, a wakeup distance range, and a maximum quantity of APs that are to be woken up.

The AP activation request includes the target AP device list, and the determining a target AP device according to the AP activation request includes: determining a to-be-selected AP device; and determining, in the to-be-selected AP device, that an AP device corresponding to an identity, which is recorded in the target AP device list, of a target AP device is the target AP device.

The registration request further includes location information of the first AP device, the AP activation request includes the location determining information, and the determining a target AP device according to the AP activation request includes: determining a to-be-selected AP device; determining, in the to-be-selected AP device according to the location information of the terminal device and location information, which is recorded by the wakeup server, of an AP device, that an AP device that is away from the terminal device by a distance within the wakeup distance range is a candidate target AP device; and determining, in the candidate target AP device, that the former T AP devices having optimal quality of service are target AP devices, where T is less than or equal to a threshold of the quantity of APs that are to be woken up.

The registration request further includes an authorized wakeup list, and the authorized wakeup list records an identity of a terminal device that is allowed to wake up the first AP device and an authentication parameter of the terminal device.

The AP activation request further includes an authentication parameter of the terminal device, and the determining a to-be-selected AP device includes: performing matching between the authentication parameter of the terminal device in the AP activation request and the authentication parameter, which is recorded in the authorized wakeup list saved by the wakeup server, of the terminal device that is allowed to wake up the AP device; performing matching between the identity of the terminal device in the AP activation request and the identity, which is recorded in the authorized wakeup list saved by the wakeup server, of the terminal device that is allowed to wake up the AP device; and when an authorized wakeup list in which an authentication parameter and an identity of a terminal device are both the same as the authentication parameter and the identity of the terminal device in the AP activation request exists in the authorized wakeup list saved by the wakeup server, acquiring an AP device providing the authorized wakeup list as the to-be-selected AP device.

The registration request further includes a public identifier, and the public identifier indicates that the first AP device allows waking up by any terminal device, and the determining a to-be-selected AP device includes: acquiring an AP device allowing waking up by any terminal device as the to-be-selected AP device.

After the sending registration response information to the first AP device, the program is further configured to: receive status update information sent by the first AP device, where the status update information includes an updated status of the AP device; and record the updated status of the AP device.

Figure 17:
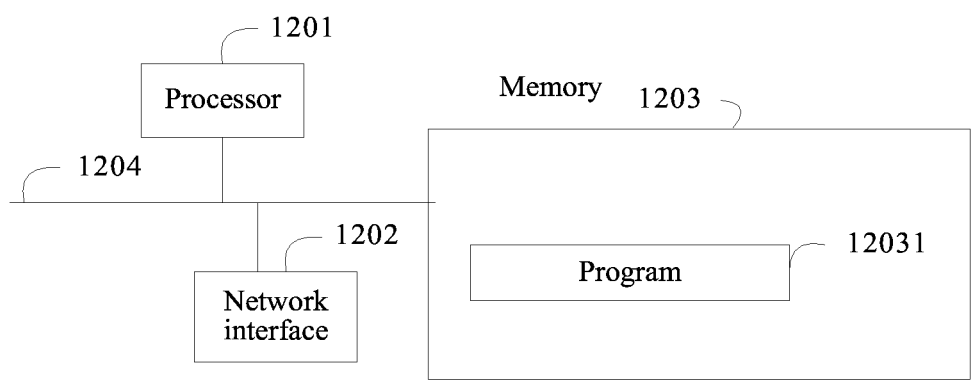
FIG. 17 is a schematic structural diagram of still another terminal device according to an embodiment of the present application.

FIG. 17 describes a structure of a terminal device according to another embodiment of the present application, and the structure includes at least one processor 1201 (such as a CPU), at least one network interface 1202 or another communications interface, a memory 1203, and at least one communications bus 1204 that is configured to implement connection and communication between these apparatuses. The processor 1201 is configured to execute an executable module stored in the memory 1203, such as a computer program. The memory 1203 may include a high speed random access memory (RAM), and may also include a non-volatile memory, such as at least one magnetic disk storage. Communication connection among the at least one network interface, an AP device, and a terminal device is implemented by using at least one network interface 1202 (which may be wired or wireless), and the Internet, a wide area network, a local network, a metropolitan area network or the like may be used.

In some implementation manners, the memory 1203 stores a program 12031, the program 12031 may be executed by the processor 1201, and the program 12031 is configured to:

send an AP activation request to a wakeup server, so that the wakeup server determines a target AP device according to the AP activation request, and when the target AP device is in a sleep state, wakes up the target AP device, where the AP activation request includes an identity of the terminal device; and receive an activation success response sent by the wakeup server.

The AP activation request further includes at least one of a target AP device list and location determining information, where the target AP device list records an identity of at least one target AP device, and the location determining information includes location information of the terminal device, a wakeup distance range, and a maximum quantity of APs that are to be woken up.

The AP activation request further includes an authentication parameter of the terminal device.

Figure 18:
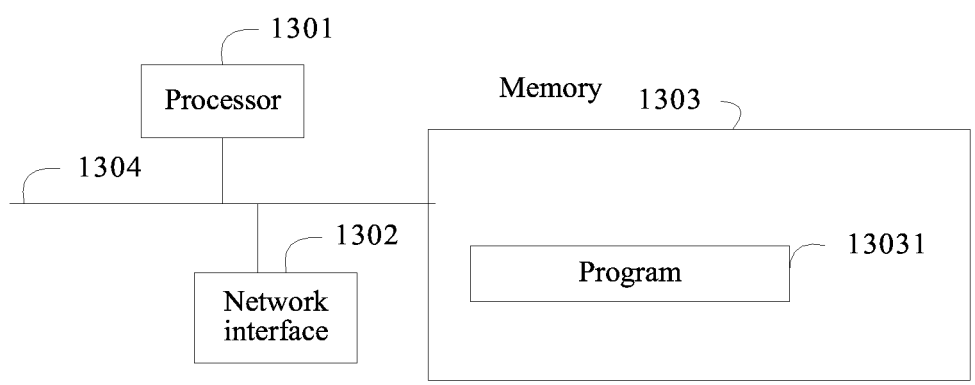
FIG. 18 is a schematic structural diagram of still yet another AP device according to an embodiment of the present application.

FIG. 18 describes a structure of an AP device 13 according to another embodiment of the present application, and the structure includes at least one processor 1301 (such as a CPU), at least one network interface 1302 or another communications interface, a memory 1303, and at least one communications bus 1304 that is configured to implement connection and communication between these apparatuses. The processor 1301 is configured to execute an executable module stored in the memory 1303, such as a computer program. The memory 1303 may include a high speed random access memory (RAM), and may also include a non-volatile memory, such as at least one magnetic disk storage. Communication connection among the at least one network interface, an AP device, and a terminal device is implemented by using at least one network interface 1302 (which may be wired or wireless), and the Internet, a wide area network, a local network, a metropolitan area network or the like may be used.

In some implementation manners, the memory 1303 stores a program 13031, the program 13031 may be executed by the processor 1301, and the program 13031 is configured to: receive an activation request sent by a wakeup server, where the activation request is sent when the wakeup server determines that the AP device is in a sleep state; and switch the AP device to an awake state according to a wakeup request.

Before the receiving an activation request sent by a wakeup server, the program is further configured to: generate a registration request, where the registration request includes an identity of the AP device and a wakeup address of the AP device; send the registration request to the wakeup server, so that when the AP device needs to be woken up, the wakeup server sends a wakeup request to the AP device according to the registration request; and receive registration response information sent by the wakeup server.

The registration request further includes location information of the AP device.

The registration request further includes an authorized wakeup list, and the authorized wakeup list records an identity of a terminal device that is allowed to wake up the AP device and an authentication parameter of the terminal device.

After the receiving registration response information sent by the wakeup server, the program is further configured to: when a status of the AP device changes, generating status update information, where the status update information includes an updated status of the AP device; and send the status update information to the wakeup server, so that the wakeup server records the updated status of the AP device.

It may be clearly understood by a person skilled in the art that, for the purpose of convenient and brief description, for a detailed working process of the foregoing system, apparatus, and unit, refer to a corresponding process in the foregoing method embodiments, and no further details are provided herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for waking up an access point (AP) device, comprising:
   receiving a registration request of a first AP device, wherein the first AP device is in a management range of a wakeup server, and the registration request comprises an identity of the first AP device and a wakeup address of the first AP device;
   sending registration response information to the first AP device;
   receiving, by the wakeup server, an AP activation request sent by a terminal device, wherein the AP activation request comprises an identity of the terminal device and one or more of a target AP device list and location determining information, wherein the target AP device list records an identity of a target AP device, and the location determining information comprises location information of the terminal device, a wakeup distance range, and a maximum quantity of APs that are to be woken up, and wherein the terminal device sends the AP activation request to an internet protocol (IP) address of the wakeup server;
   determining the target AP device according to the AP activation request;
   acquiring a status of the target AP device;
   in response to the target AP device being in a sleep state, sending a wakeup request to the target AP device, so that the target AP device switches to an awake state according to the wakeup request; and
   sending a first AP activation success response to the terminal device.

2. The method according to claim 1, wherein the method further comprises:
   in response to the target AP device being in an awake state, sending a second AP activation success response to the terminal device.

3. The method according to claim 1, wherein:
   the registration request further comprises location information of the first AP device;
   the AP activation request comprises the location determining information; and
   determining the target AP device according to the AP activation request comprises:
     determining one or more to-be-selected AP devices;
     determining, in the one or more to-be-selected AP devices according to the location information of the terminal device and location information, which is recorded by the wakeup server, of one or more AP devices, that one or more AP devices that are away from the terminal device by a distance within the wakeup distance range are one or more candidate target AP devices; and
     determining, in the one or more candidate target AP devices, that TAP devices having optimal quality of service are target AP devices, wherein T is less than or equal to a threshold of a quantity of APs that are to be woken up.

4. A wakeup server, comprising:
   a receiver, configured to:
     receive a registration request of a first AP device, wherein the first AP device is in a management range of the wakeup server, and the registration request comprises an identity of the first AP device and a wakeup address of the first AP device; and
     receive an AP activation request sent by a terminal device, wherein the AP activation request comprises an identity of the terminal device, a list of target AP devices, and location determining information, and the location determining information comprises location information of the terminal device, a wakeup distance range, and a maximum quantity of APs that are to be woken up, and wherein the list of target AP devices identifies a plurality of target AP devices;
   a processor, configured to:
     determine a first target AP device according to the AP activation request and the list of target AP devices; and
     acquire a status of the first target AP device; and
   a transmitter, configured to:
     send registration response information to the first AP device;
     in response to the first target AP device being in a sleep state, send a wakeup request to the first target AP device, so that the first target AP device switches to an awake state according to the wakeup request; and
     send a first AP activation success response to the terminal device.

5. The wakeup server according to claim 4, wherein the transmitter is further configured to:
   in response to the first target AP device being in an awake state, send a second AP activation success response to the terminal device.

6. The wakeup server according to claim 4, wherein:
the processor is further configured to:
- determine one or more to-be-selected AP devices;
- determine, in the one or more to-be-selected AP devices according to the location information of the terminal device and location information, which is recorded by the wakeup server, of one or more AP devices, that one or more AP devices that are away from the terminal device by a distance within the wakeup distance range are one or more candidate target AP devices; and
- determine, in the one or more candidate target AP devices, that T AP devices having optimal quality of service are second target AP devices, wherein T is less than or equal to a threshold of a quantity of APs that are to be woken up, and wherein the second target AP devices include the first target AP device.

* * * * *